United States Patent [19]

Pano

[11] Patent Number: 5,079,979
[45] Date of Patent: Jan. 14, 1992

[54] CLAMPING MEANS FOR A HOLDER FOR A CUTTING TOOL

[75] Inventor: Joseph Pano, Nahariya, Israel

[73] Assignee: Iscar Ltd., Tefen, Israel

[21] Appl. No.: 578,065

[22] Filed: Sep. 5, 1990

[30] Foreign Application Priority Data

Sep. 8, 1989 [IL] Israel ............................ 91576

[51] Int. Cl.⁵ .................... B23B 29/00; B26D 1/00
[52] U.S. Cl. ......................... 82/158; 407/110; 407/117; 407/91
[58] Field of Search .............. 82/157, 158, 160, 99.1; 29/50, 52; 408/714; 407/101–105, 107–110, 50, 46, 91, 117, 8, 9, 10

[56] References Cited

U.S. PATENT DOCUMENTS

| | | | |
|---|---|---|---|
| 2,556,123 | 6/1951 | Hoffart | 407/91 |
| 3,505,715 | 4/1970 | Germani | 407/117 X |
| 3,894,322 | 7/1975 | Pano | 407/117 X |
| 4,202,651 | 5/1980 | St. Jean | 407/117 X |
| 4,604,004 | 8/1986 | Armbrust | 407/117 X |

Primary Examiner—Gary F. Paumen
Assistant Examiner—Julie R. Daulton
Attorney, Agent, or Firm—Burgess, Ryan & Wayne

[57] ABSTRACT

An elongated tool block for use in metal grooving, parting, turning or boring operations and being of the kind consisting of two component blocks which, when screw coupled together, also clamp a holder blade thereto, one of the blocks being formed with an elongated edge surface serving to delimit an outer longitudinal boundary of a holder blade retaining groove, and having an end portion and an intermediate portion; a relatively resilient coupling portion of this one block serving to couple the end and intermediate portions together; there being furthermore provided first screw coupling means for screw coupling the component blocks together at the intermediate portion and second screw coupling means for screw coupling the component blocks together at the end portion.

4 Claims, 2 Drawing Sheets

CLAMPING MEANS FOR A HOLDER FOR A CUTTING TOOL

FIELD OF THE INVENTION

This invention relates to metal cutting tools of the kind intended for use in metal grooving, parting, turning or boring operations. The invention relates in particular to such tools which involve the use of replaceable cutting inserts designed to be held firmly in an insert holder block which, in its turn, is designed to be clamped in an appropriate tool block.

BACKGROUND OF THE INVENTION

With metal cutting tools of this kind, the insert is designed to be held in a seat formed in the insert holder blade and the invention is specifically concerned with an insert holder wherein the seat is defined between a pair of jaws of the insert holder, means being provided for mechanically biasing the jaws into clamping the insert in the seat.

Usually, the insert holder blade is formed as an elongated rectangular planar element and is retained within appropriate grooves formed in the tool block and is screw clamped to the tool block.

The retaining grooves formed in the tool block can be defined within a unitary tool block or, alternatively, one of the grooves is defined within a major portion of the tool block, whilst the other groove is associated with a minor, separate portion of the tool block. Screw bolting means are provided for bolting together the two portions of the tool block and, at the same time, clamping in position the insert holder blade within the tool block. Where, as indicated above, the insert itself is retained between the insert holder jaws, the clamping of the insert holder to the tool block can at the same time be effective in biasing the jaws towards each other so as to clamp the insert between the jaws.

With such a known arrangement, i.e. where the insert is clamped within the insert holder blade and the insert holder is clamped within the tool block by one and the same bolt clamping means, every time that an insert has to be replaced the bolt clamping means is loosened, thereby allowing for the removal and replacement of the insert. At the same time, however, the insert holder blade itself is loosened within the tool block and, upon replacement of the insert, the holder blade must be re-positioned so as to ensure the correct positioning thereof vis a vis the tool block and in consequence, the correct positioning of the insert.

BRIEF SUMMARY OF THE INVENTION

It is an object of the present invention to provide a new and improved tool block for use in a cutting tool wherein the above-referred-to disadvantage of having to re-position the insert holder blade within the tool block every time an insert is replaced is obviated.

According to the present invention there is provided an elongated tool block comprising a first, major component block having, adjacent a base region thereof, an integrally formed first longitudinally directed blade retaining element; and a second, discrete minor component block constituting a second longitudinally directed blade retaining element; said retaining elements having formed therein a pair of longitudinally directed grooves adapted to receive opposite longitudinal edges of an insert holder blade; and screw coupling means for screw coupling the first and second component blocks together and thereby clamp the holder blade to the tool block;

characterised in that said second component block is formed with an elongated edge surface serving to delimit an outer longitudinal boundary of the groove of the second component block; and has an end portion and an intermediate portion of said second component block; a relatively resilient coupling portion of the second component block serves to couple said end and intermediate portions together; said screw coupling means includes first means for screw coupling the component blocks together at the intermediate portion and second means for screw coupling the component blocks together at the end portion.

Preferably, an intermediate extent of the edge surface of said intermediate portion is inset with respect to the remaining portions of the edge surface of the end portion and the intermediate portion with said resilient coupling portion being seated adjacent said inset intermediate extent.

With a tool block in accordance with the invention, an insert holder blade is inserted and retained within the longitudinally directed grooves with the insert seat and the jaws defining this insert seat being located adjacent the end portion of the second component block. The insert holder blade is correctly positioned within the block and is clamped in this position by means of the first screw coupling means. The insert is then placed within the seat and the second screw coupling means is tightened so as to cause the end portion of the second component block to flex towards the holder blade about the relatively resilient component portion thereof, thereby effectively biasing the jaws towards one another and into clamping the insert in position. When it is desired to remove or replace the insert, all that is required for the second screw coupling means to be loosened, whereupon the insert can be readily removed and a new insert replaced without, at the same time, unclamping the insert holder blade from the tool block.

In this way, the replacement of inserts is not accompanied by a loosening of the insert holder and therefore the re-positioning of the insert holder blade after each insert replacement is no longer required.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
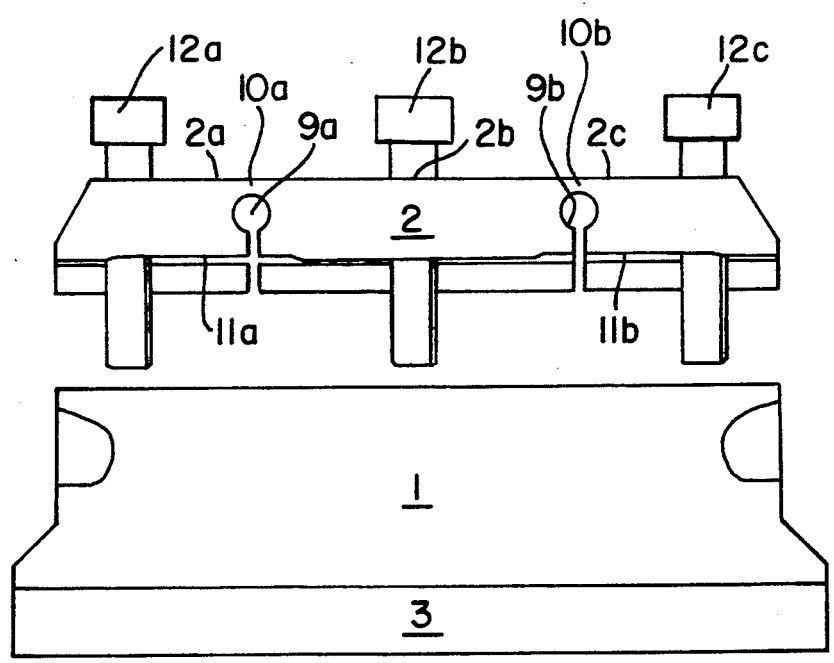
FIG. 1 is a front elevation of an exploded view of a tool block in accordance with the present invention.

As seen in the drawings, an elongated tool block comprises a first, major component block 1 and a second, minor component block 2. The major component block 1 is provided, adjacent a base region thereof, with an integrally formed longitudinally directed holder blade retaining element 3, which defines with the component block proper a longitudinally directed groove 4. The minor component block 2 is coextensive with the upper surface of the major component block 1 and is formed at a rear portion thereof with an angled skirt 5 adapted to abut a correspondingly angled shoulder 6 formed in the upper surface of the major component block 1. The minor component block 2 is furthermore formed at the opposite edge thereof with an angularly directed projection 7 which defines with a corresponding edge of the upper surface of the block 6 a retaining groove 8 located above and directly opposite and coextensive with the retaining groove 4.

The minor component block 2 consists of three successive portions 2a, 2b and 2c, the portions 2a and 2c being herein referred to as "end portions" and the portion 2b being herein referred to as an "intermediate portion". Extending through the end portions 2a and 2c are respective slits 9a and 9b so that, adjacent these slits, there are formed in the minor component block 2 relatively resilient block portions 10a and 10b.

As can be seen in the drawings, the edges 11a and 11b of the longitudinal projecting rib 7 in the region of the slits 9a and 9b are inset with respect to the remaining portions of the edge of the projecting rib 7.

Figure 4:
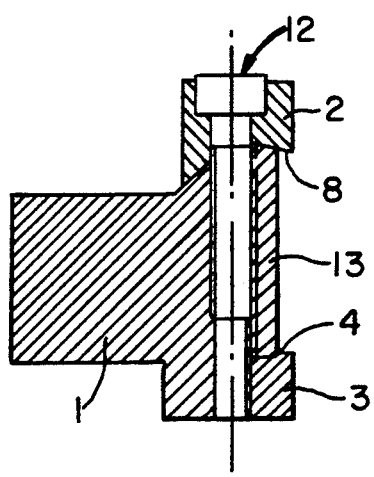
FIG. 4 is a cross-sectional view of the tool block and insert holder blade shown in FIG. 3.

The tool block is provided with end clamping bolts 12a and 12c and with a central clamping bolt 12b. As can be seen in FIG. 4 of the drawings, corresponding threaded bores are formed in the major component block 1 into which the clamping bolts 12a, 12b and 12c are screwed so as to clamp the minor component block 2 to the major component block 1.

Figure 2:
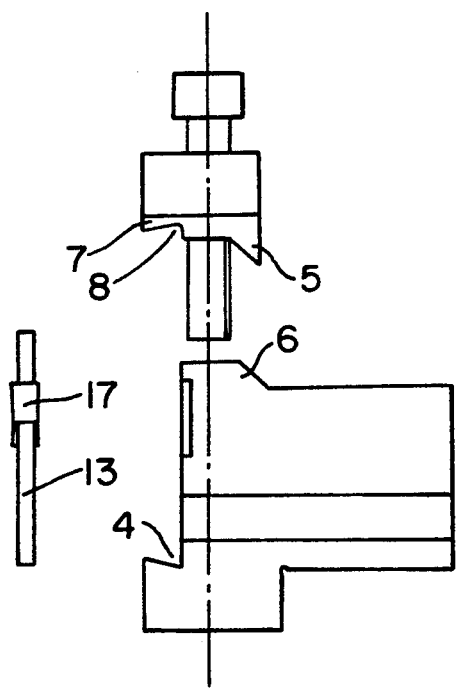
FIG. 2 is a side elevation of an exploded view of the tool block shown in FIG. 1, together with a side elevation of an insert holder blade and insert to be retained within the tool block.
Figure 3:
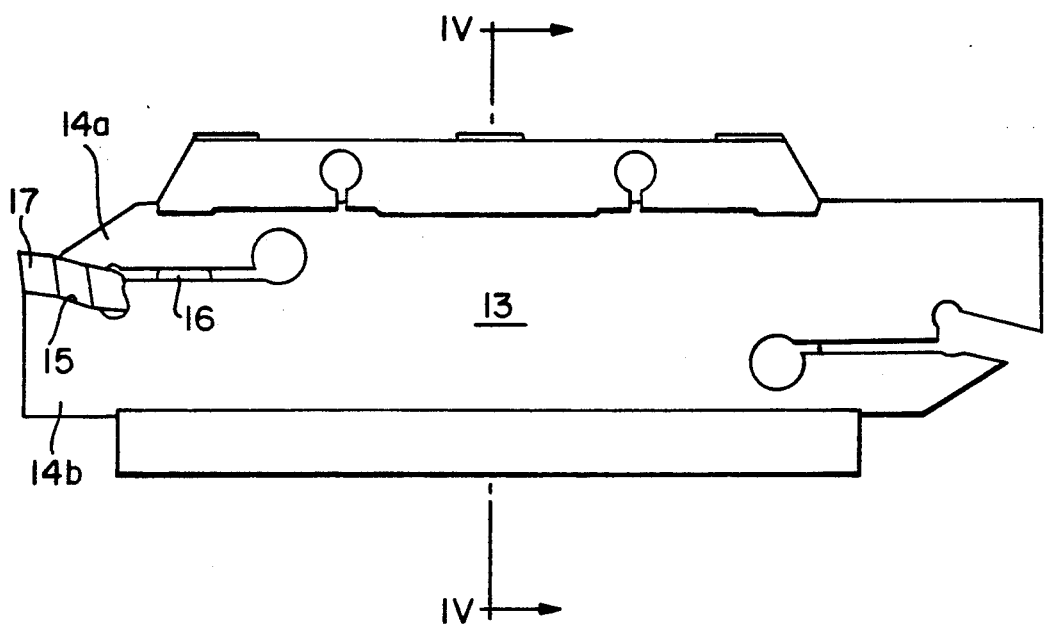
FIG. 3 is a front elevation of the tool block within which is retained the insert holder blade having clamped therein an insert.

As seen in FIGS. 2 and 3 of the drawings, an insert holder blade 13 in which is formed a pair of jaws 14a and 14b, has defined between the jaws an insert seat 15 which communicates with an elongated slit 16 formed in the holder blade 13. The provision of this slit allows for the resilient biasing of the jaws 14a and 14b towards one another so as to clamp between them an insert 17.

In use, the two component blocks 1 and 2 are juxtaposed with the component block 2 resting upon the upper surface of the component block 1 and, in this position, the clamping bolts 12a, 12b and 12c are screwed into the appropriate threaded bores formed in the component block 1 so that the component blocks are loosely held together. The insert holder blade 13 is then inserted into the retaining grooves 4 and 8 and is positioned correctly within the block. When the positioning of the holder blade 13 has been finally determined, the clamping bolt 12b is screwed into its final clamping position, as is the clamping bolt 12c. The insert 17 is placed into the insert seat 15 and the clamping bolt 12a is now screwed down into the appropriate threaded bore formed in the component block 1. By virtue of the provision of the resilient coupling portion 10a and the inset edge 11a, the tightening of the clamping bolt 12a results in the downward biasing of the jaw 14a so as to ensure the effective clamping of the insert 17 within the insert holder blade 13.

If now it is desired to replace the insert 17, then all that is needed is for the clamping bolt 12a to be loosened. The end portion 2a of the component block 2 thereupon resiliently releases its biasing pressure on the jaw 14a, allowing for the removal and replacement of the insert 17 without at the same time interfering in any way with the positioning of the insert holder 13 within the block, seeing that the insert holder continues to be firmly clamped by the clamping bolt 12b and also by the clamping bolt 12c.

In view of the fact that the same tool block can be utilised for right-hand and left-hand mounting of the cutting insert, the component block 2 is formed symmetrically with end portions, slits and resilient coupling portions so that as required, either the coupling bolt 12a or the coupling bolt 12c can be used to clamp the insert in position in the insert holder, depending on whether the insert is mounted in a right-hand or in a left-hand position.

I claim:

1. An elongated tool block comprising a first, major component block having, adjacent a base region thereof, an integrally formed first longitudinally directed insert holder blade retaining element; and a second, discrete minor component block comprising a second longitudinally directed insert holder blade retaining element; said insert holder blade retaining elements having formed therein a pair of longitudinally directed grooves adapted to receive opposite longitudinal edges of an insert holder blade; and screw coupling means for screw coupling the first and second component blocks together and thereby clamp the insert holder blade to the tool block; wherein said second component block is formed with an elongated edge surface serving to delimit an outer longitudinal boundary of the groove of the second component block and has an end portion and an intermediate portion coupled by a relatively resilient coupling portion which resiliently couples said end and intermediate portions thereof; said screw coupling means includes first means for screw coupling the component blocks together at the intermediate portion and second means for screw coupling the component blocks together at the end portion.

2. A tool block according to claim 1, wherein an intermediate extend of the edge surface of said end portion is inset with respect to the remaining portions of the edge surface of the end portion and the intermediate portion with said resilient coupling portion being seated adjacent said inset intermediate extent.

3. A tool block according to claim 1 or 2, wherein said relatively resilient coupling portion is located between a longitudinal surface of the second component block and a transversely directed slit formed in the second component block.

4. A tool block according to claim 3, wherein the second component block is formed with a pair of end portions and one intermediate portion with two relatively resilient coupling portions serving respectively to couple the end portions to the intermediate portion.

* * * * *